US006078811A

United States Patent [19]
Lin et al.

[11] Patent Number: 6,078,811
[45] Date of Patent: Jun. 20, 2000

[54] MOBILE USER REGISTRATION OVERFLOW CONTROL FOR PORTABLE COMMUNICATIONS NETWORK

[75] Inventors: Yi-Bing Lin, Taichung; Chen-Fang Tsai, Hsinchu; Jui-Long Ou, Hsinchu; Chun-Shiow Chen, Hsinchu, all of Taiwan

[73] Assignee: Industrial Technology Research Institute, Hsinchu, Taiwan

[21] Appl. No.: 08/905,595

[22] Filed: Aug. 4, 1997

[51] Int. Cl.[7] .................................................. H04Q 7/00
[52] U.S. Cl. ................................... 455/433; 455/435
[58] Field of Search .................................. 455/422, 432, 455/433, 435, 445, 458

[56] References Cited

U.S. PATENT DOCUMENTS 5,561,854  10/1996  Antic et al. ............................. 455/433

*Primary Examiner*—Reinhard J. Eisenzopf
*Assistant Examiner*—Marsha D. Banks-Harold
*Attorney, Agent, or Firm*—Proskauer Rose LLP

[57] ABSTRACT

A mobile communication system is disclosed including one or more home location registers, one or more visitor location registers and one or more mobile terminal equipments. Each mobile terminal equipment is served by a single home location register. Each registration area or geographical area of mobile communication service is covered or served by a visitor location register. "Overflow" mobile terminals, i.e., more mobile terminals than user records that can be maintained at the visitor location registers, are permitted to register at the visitor location registers. To that end, each home location register maintains an indication, e.g., a bit, for each mobile terminal it manages indicating whether or not the mobile terminal is an overflow mobile termninal. When a mobile terminal is registered at the visitor location register and no user records are available, the visitor location record nevertheless registers the mobile terminal. One mobile terminal is selected as an overflow terminal and the user record for that terminal is deleted or is not generated. The home location register for the overflow mobile terminal then sets the overflow indicator for the mobile terminal to indicate that it is is the overflow terminal. Overflow mobile terminals are easily canceled—no user record is stored for such mobile terminals at the visitor location register. Calls can be originated by overflow mobile terminals by first forcing them to re-register. To terminate calls to overflow mobile terminals, the visitor location register must allocate a user record to the overflow terminal, including possibly selecting another mobile terminal as an overflow mobile terminal, thereby making a user record available.

17 Claims, 4 Drawing Sheets

6,078,811

MOBILE USER REGISTRATION OVERFLOW CONTROL FOR PORTABLE COMMUNICATIONS NETWORK

RELATED APPLICATIONS

This application is related to the following patents and patent applications:

(1) U.S. Pat. No. 5,570,370, entitled, "Frame Timing Acquistion Method and System for Cordless TDMA Systems, filed Apr. 28, 1995 for Hung-Sheng Lin, (2) U.S. patent application Ser. No. 08/544,386, entitled, "Seamless Handoff for Wireless LAN/Wired LAN Internetworking, filed Oct. 9, 1995 for Yao-Tzung Wang, Tzung-Pao Lin and Nen-Fu Huang, and (3) U.S. patent application Ser. No. 08/747,696, entitled, "Mobile Virtual LAN on ATM Network," filed Nov. 12, 1996 for Nen-Fu Huang, Yao-Tzung Wang and Tzung-Pao Lin.

The above-listed patent and patent applications are assigned to the same assignee as this application and are incorporated herein by reference.

FIELD OF THE INVENTION

The present invention pertains to portable terminal communications networks, such as cellular communications networks, in which portable terminals/transceivers, such as hand-held cellular phones.

BACKGROUND OF THE INVENTION

FIG. 1 shows a mobile communications network 10. A base station 12 is positioned in a covered area or cell 16. Mobile terminals (e.g., cell phones) 14 in the vicinity of cell 16 are capable of communicating with other mobile terminals 14 or 14' or stationary terminals 26. This invention is illustrated herein with reference to a cellular communications system, although, the invention is applicable to any communications system in which terminals or transceivers are mobile, move from cell to cell, and register and deregister with base stations as a result of movement from cell to cell. To communicate with such other terminals 14, 14' or 26, the mobile terminals 14 communicate (transmit and receive) signals and messages with the base station 12. Mobile terminal 14' is outside of the cell 16 and does not use the base station 12 for purposes of communicating with other terminals 14 or 26. However, the mobile terminal 14' may be in another cell (not shown) serviced by another base station (not shown) which provides service to the mobile terminal 14' in an analogous fashion as described below.

By their nature, mobile terminals 14 and 14' are mobile. It is important to keep track of the location of mobile terminals 14 or 14' (i.e., in which cells 16 they are located) in order to enable the mobile terminals to originate calls, to receive calls and to maintain calls, despite any dynamic movement of the mobile terminals 14 or 14'. To that end, home location registers (HLRs) 22 and visitor location registers (VLRs) 20 are provided. The purpose of the HLR 22 is to keep track of a specific, predetermined group of mobile terminals 14, 14', wherever they may move, and to provide telephone number to routing address mapping. The purpose of the VLR 20 is to keep track of any mobile terminals 14 which move into a specific registration area (RA) managed by the VLR 20. For sake of convenience herein, it is assumed that the RA covers the same geography as the cell 16, although it is possible for the RA to cover a different sized area than the cell 16 (e.g., the RA can cover multiple cells 16). Stated one way, the HLR 22 is a mobile terminal specific register, whereas the VLR 20 is a location specific register.

According to the GSM and IS-41 standards, mobile terminals 14, 14' VLRs 20 and HLRs 22 obey a handoff registration procedure in order to keep track of the mobile terminals 14, 14'. Generally stated, a mobile terminal 14, 14' registers with a VLR 20 when it moves into the RA of the VLR 20 and deregisters with the VLR of the RA out of which the mobile terminal 14, 14' has moved. The VLR 20 with which the mobile terminal 14,14' registers records information regarding the mobile terminal 14, 14' in a local database. The VLR 20 also contacts the HLR 22 and informs the HLR 22 that a mobile terminal 14,14' of which the HLR 22 keeps track has now moved into the RA covered by the VLR 20. FIG. 2 shows an illustrative architecture for the VLR 20 or HLR 22. The VLR 20 or HLR 22 has a processor 31, main memory 33, disk memory 35, receiver 37 and transmitter 39 connected to a bus 30. (The receiver 37 and transmitter 39 may be combined into a single transceiver.)

When another terminal, such as stationary terminal 26, desires to contact the mobile terminal 14, 14', the public switched telephone network (PSTN) 24 contacts the HLR 22. The HLR 22 obtains the appropriate routing information from the VLR 20 covering the RA in which the mobile terminal 14 is located. The HLR 22 then routes the call, using routing information provided by the VLR 20, and via the mobile switching center (MSC) 18 and base station 12, to the mobile terminal 14. Likewise, when the mobile terminal 14 desires to originate a call, the base station 12 routes the originating call to the MSC 18. The MSC 18 contacts the VLR 20 that covers the RA in which the mobile terminal 14 is located. The VLR 20 provides the necessary routing information to the MSC 18 which then completes the call, e.g., using the PSTN 24.

These registration and call origination/completion procedures are now described in greater detail. In the illustrations below, it is assumed that all actions of the VLR V2 20 or HLR 22 are performed under control of the processor 31 (FIG. 2) located at the VLR 20 or HLR 22, respectively. Likewise, all messages are presumed to be received by the appropriate receiver 37 or transmitted by the appropriate transmitter 39. Records are stored, retrieved or modified in a storage that includes the disk memory 35 and/or main memory 33. Note also that the process steps described below are abbreviated for sake of clarity. For example, security steps have been omitted.

FIG. 3 shows the registration operation:

S1.1 In a first step S1.1, the mobile terminal u1 14 transmits a registration request message reg_msg to the VLR V2 20 that covers the RA into which the mobile terminal u1 14 has moved.

S1.2 Next, in step S1.2, the VLR V2 20 sets up a temporary user record u1 in its storage.

S1.3 In step S1.3, the VLR V2 20 transmits the message reg_jmsg(u1) to the HLR which message indicates the registration of the mobile terminal u1 at the VLR V2 20. The message reg_msg(u1) is the MAP_UPDATE_LOCATION message according to the GSM standard and the message REGNOT in according to the IS-41 standard.

S2.1 The HLR 22 receives the message reg_msg(u1). In step S2.1, the HLR 20 updates the map record corresponding to mobile terminal u1 14. That is, u1 is used as an index to retrieve the map record corresponding thereto. The indication of the retrieved map record that indicates the VLR covering the RA into which the mobile terminal u1 14 has moved is modified to indicate the VLR V2 20.

S2.2 In step S2.2, the HLR 22 transmits a message reg_ack(u1,profile) to the VLR V2 20 which transmitted the reg_msg(u1) to the HLR 20 in step S1.3. This message acknowledges receipt of the message reg_msg(u1) and the updating of the map record at the HLR 22. The reg_ack is the MAP_UPDATE_LOCATION_ack message according to the GSM standard and the message regnot according to the IS-41 standard.

S2.3 VLR V2 20 receives the message reg_ack(u1, profile) message and finalizes the user record for mobile terminal u1 14. In step S2.3, VLR V2 20 transmits the message reg_ack to the mobile terminal u1 14 acknowledging completion of the registration process.

FIG. 4 shows a conventional registration cancellation (deregistration) process in which the mobile terminal u1 14 moves from the RA of VLR V1 20 to the RA of VLR V2 20:

S3.1 In step S3.1, the HLR 22 first transmits the message cancel_msg(u1) to the VLR V1 covering the RA from which the mobile terminal u1 14 has moved. This message requests that the VLR V1 cancel its user record for the mobile terminal u1. The cancel_msg message is the MAP_CANCEL_LOCATION message according to the GSM standard and the REGCANC message according to the IS-41 standard.

S3.2 In step S3.2, VLR V1 20 deletes the user record for the mobile terminal u1 14.

S3.3 In step S3.3, VLR V1 20 transmits the message cancel_ack to the HLR 22 in order to acknowledge cancellation of the user record. The cancel_ack message is the MAP_CANCEL_LOCATION_ack message according to the GSM standard and the regcanc message according to the IS-41 standard.

FIG. 5 shows a conventional call origination process:

S4.1 In step S4.1, the mobile terminal u1 transmits a message for originating a call to the MSC.

S4.2 The MSC receives the call origination message. In step S4.2, the MSC transmits a call_req(u1) message to the VLR V2 which message requests the VLR V2 to approve or disapprove the call request. The call_req message is the MAP_SEND_INFO_FOR_OUTGOING_CALL according to the GSM standard and ORREQ according to the IS-41 standard.

S4.3 VLR V2 receives the call_req(u1) message. In step S4.3, VLR V2 examines the user record for mobile terminal u1 and allows the request. VLR V2 transmits the message call_ack to the MSC which message approves the call. The call acknowledge message is the MAP_SEND_INFO_FOR_OUTGOING_CALL_ack message according to the GSM standard and the orreq message according to the IS-41 standard.

S4.4 In step S4.4, the MSC completes the call. In this case, the called terminal is the stationary terminal 26. Therefore, the call is completed through the PSTN 24.

FIG. 6 shows the call termination (completion) process. In this illustration, the call is assumed to have originated from the stationary terminal 26 on the PSTN 24:

S5.1 In step S5.1, the originating terminal 26 dials the mobile terminal's u1 phone number, which illustratively is the mobile subscriber ISDN number (MSISDN) according to the GSM standard and the mobile identification number (MIN) according to the IS-41 standard.

S5.2 In step S5.2, a central office or toll office switch of the PSTN 24 transmits the message loc_req(u1) to the HLR of the mobile terminal u1. The message loc_req (u1) requests the routing address for the mobile terminal u1. The loc_req message is the MAP_SEND_ROUTING_INFORMATION message according to the GSM standard and the ROUTREQ message according to the IS-41 standard.

S5.3 In step S5.3, HLR examines the map record indexed by the mobile terminal u1 identifier. The retrieved map record indicates that the mobile terminal is in the RA covered by VLR V2. The HLR thus transmits the message rout_req(u1) to VLR V2 to determine the routing information for mobile terminal u1. The rout_req message is the MAP_PROVIDE_ROAMING_NUMBER message according to the GSM standard and the ROUTREQ message according to the IS-41 standard.

S5.4 The message rout_req(u1) is received at VLR V2. In step S5.4, VLR V2 determines the routing address of mobile terminal u1. VLR V2 then transmits the message rout_ack(rout_addr) back to the HLR of mobile terminal u1 containing the routing address "rout_addr" for the mobile terminal u1. The message rout_ack is the MAP_PROVIDE_ROAMING_NUMBER_ack message according to the GSM standard and routreq according to the IS-41 standard.

S5.5 The HLR receives the message rout_ack(rout_addr). In step S5.5, the HLR transmits the message loc_ack(rout_addr) to the switch of PSTN 24 which originally transmitted the message loc_req(u1), which message contains the requested routing address for the mobile terminal u1. The message loc_ack is the MAP_SEND_ROUTING_INFORMATION_ack according to the GSM standard and routreq according to the IS-41 standard.

S5.6 In step S5.6, the switch of PSTN 24 that receives the message loc_ack(rout_addr) uses the routing address rout_addr for connecting the call to MSC.

S5.7 In step S5.7, MSC pages the mobile terminal u1 within its coverage area and connects the call to mobile terminal u1 after receiving an acknowledgment from mobile terminal u1.

Generally speaking, the HLR can be designed to always have sufficient storage space for storing enough records to keep track of each mobile terminal to which it is assigned. On the other hand, the VLR cannot be guaranteed to have sufficient storage space to maintain user records for every mobile terminal that might move into the RA covered by the VLR. If the VLR runs out of storage space for user records then a mobile terminal moving into the RA covered by the VLR is refused service. This is disadvantageous.

It is an object of the present invention to overcome the disadvantages of the prior art.

SUMMARY OF THE INVENTION

An illustrative environment of use of the present invention is a mobile communication system including one or more home location registers, one or more visitor location registers and one or more mobile terminal equipments. Each mobile terminal equipment is served by a single home location register. Each registration area or geographical area of mobile communication service is covered or served by a visitor location register. Mobile terminals must register with the visitor location register of the registration area into which the mobile terminal moves and must deregister or cancel registration with the visitor location register covering the registration area from which the mobile terminal moves. Each home location register must complete or terminate calls to mobile terminals that they keep track of by keeping track of the current visitor location register covering the registration area containing the mobile terminal. Each visitor location register must assist mobile terminals, in the registration area it covers, to originate calls.

According to one embodiment, "overflow" mobile terminals, i.e., more mobile terminals than user records that can be maintained at the visitor location registers, are permitted to register at the visitor location registers. To that end, each home location register maintains an indication, e.g., a bit, for each mobile terminal it manages indicating whether or not the mobile terminal is an overflow mobile terminal. When a mobile terminal is registered at the visitor location register an no user records are available, the visitor location record nevertheless registers the mobile terminal. One mobile terminal is selected as an overflow terminal and the user record for that terminal is deleted or is not generated. The home location register for the overflow mobile terminal then sets the overflow indicator for the mobile terminal to indicate that it is the overflow terminal. Overflow mobile terminals are easily canceled—no user record is stored for such mobile terminals at the visitor location register. Calls can be originated by overflow mobile terminals by first forcing them to reregister. To terminate calls to overflow mobile terminals, the visitor location register must allocate a user record to the overflow terminal, including possibly selecting another mobile terminal as an overflow mobile terminal, thereby making a user record available.

In this fashion, a visitor location register can register and accommodate more mobile terminals than user records that can be stored at the visitor location register.

DETAILED DESCRIPTION OF THE INVENTION

Figure 1:
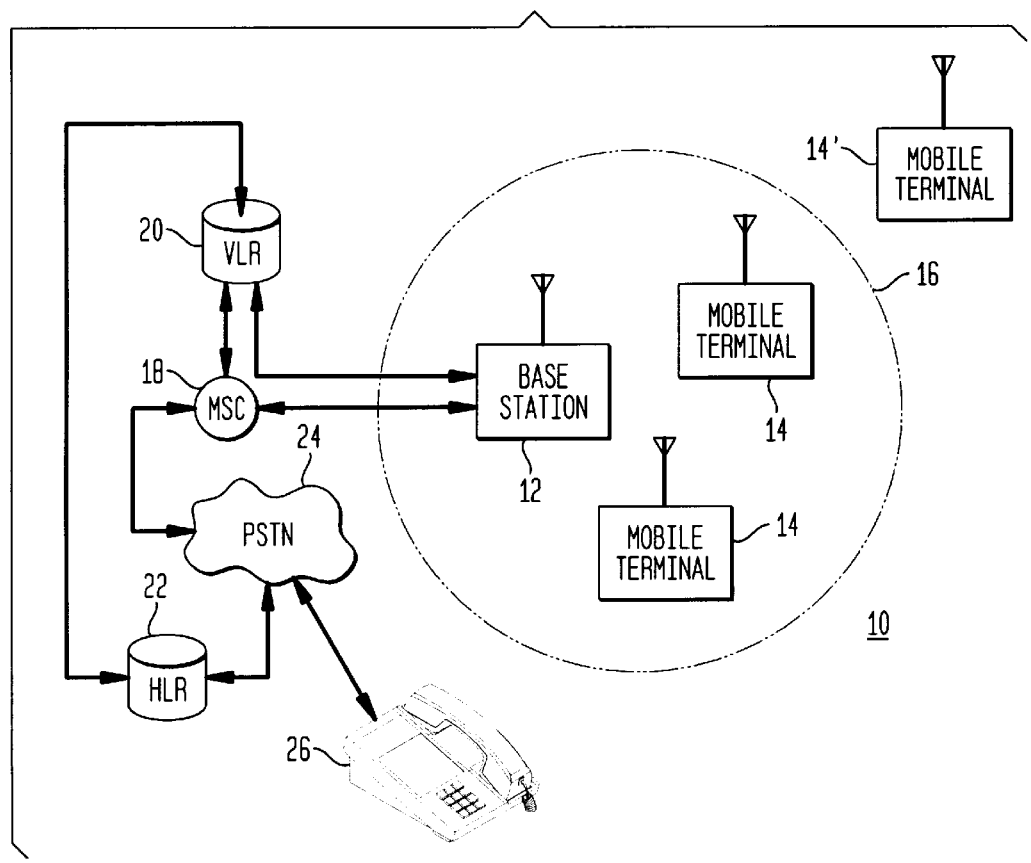
FIG. 1 shows a conventional cell communication system.
Figure 2:
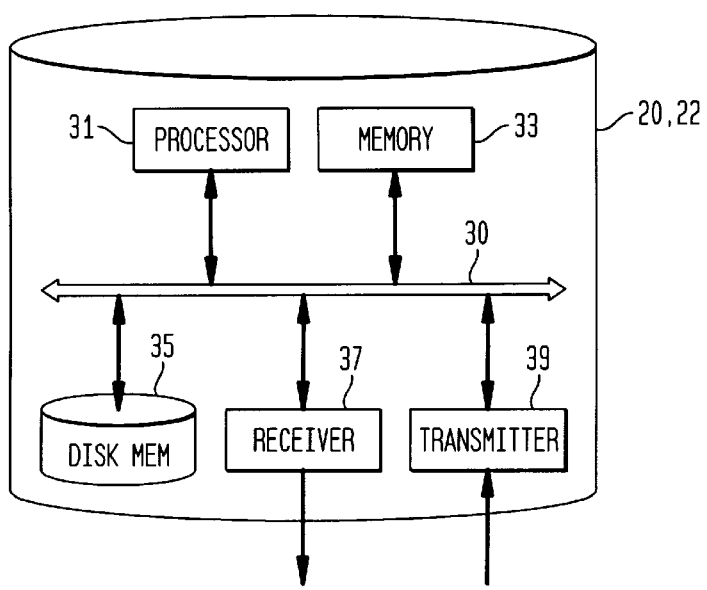
FIG. 2 shows a conventional home location register or visitor location register.

According to the present invention, the architecture of the communications network shown in FIG. 1 and of the HLR and VLR of FIG. 2 may be adapted as follows. The HLR storages (disk memory or main memory) are modified to have an extra indicator or bit/flag field. The indicator indicates whether or not the mobile terminal is an overflow mobile terminal at the RA in which is located. An overflow mobile terminal is a mobile terminal for which the VLR does not have a user record. Despite not having a user record for the overflow terminal, communication is nevertheless provided for the overflow terminal by the VLR. This is described in greater detail below. The processors of the HLRs and VLRs are furthermore modified to operate according to the processes set forth below.

Note that the modifications described herein can be achieved easily in already deployed communications systems through simple hardware and software modifications. The net effect is dramatic—many more mobile terminals can obtain service in each RA without requiring expensive storage equipment outlays for upgrading each VLR.

Figure 7:
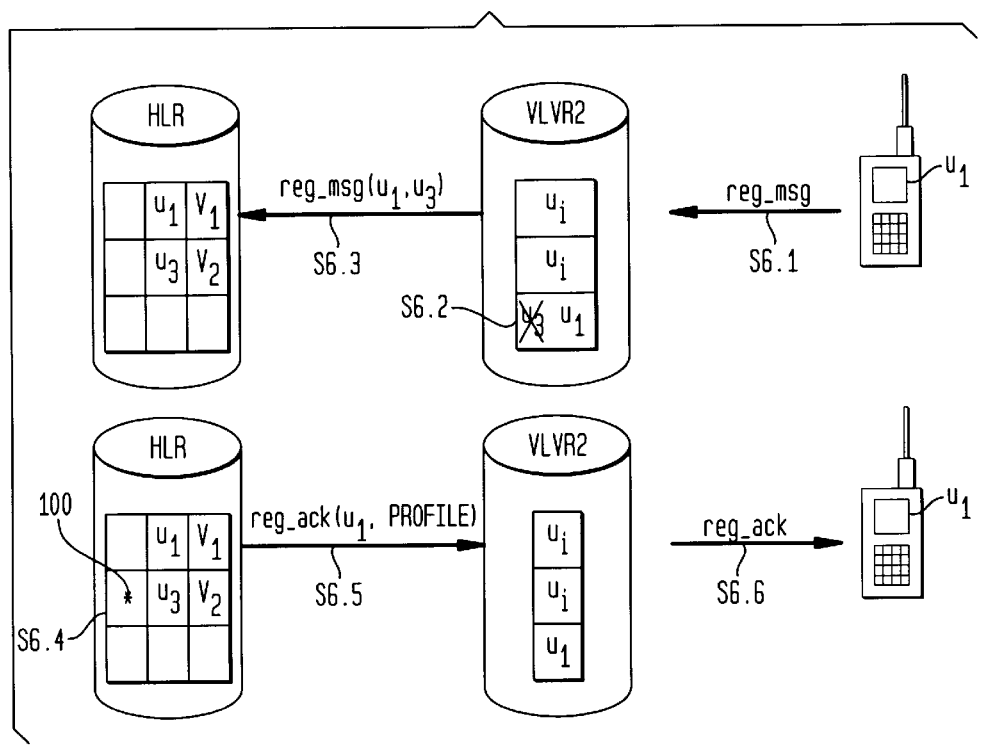
FIG. 7 shows a registration process according to an embodiment of the present invention.

FIG. 7 shows a registration procedure according to an embodiment of the present invention. Assume that mobile terminal u1 moves from the RA covered by VLR V1 to the RA covered by VLR V2. The executed steps S6.1–S6.6 are as follows:

S6.1 In step S6.1, the mobile terminal u1 transmits a reg_msg to VLR V2 for requesting registration.

Figure 3:
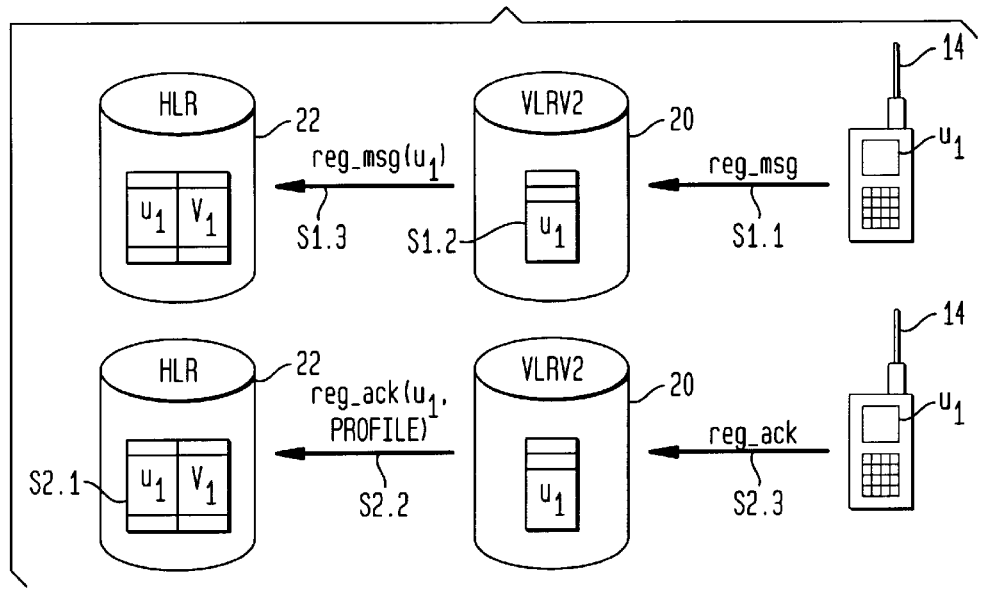
FIG. 3 shows a conventional registration process.

S6.2 VLR V2 receives the reg_msg. In step S6.2, VLR V2 determines whether or not it has an available user record to allocate to the mobile terminal u1. If so, steps similar to S1.2–S2.3 (FIG. 3) are performed. Assume, however, that VLR V2 is full, i.e., there are no unused user records available. In such a case, VLR V2 selects one mobile terminal to be an overflow terminal. The selected mobile terminal can be the new mobile terminal u1 or an existing mobile terminal already registered at VLR V2 for which VLR V2 stores a user record. The mobile terminal selection criterion can be a least recently used criterion, the ordering of the records in the database, a random choice, etc. Assume the VLR V2 selects the mobile terminal u3 to be the overflow mobile terminal. In such a case, VLR V2 deletes the record allocated to mobile terminal u3 or over-writes the record with user information (e.g., routing address) for the mobile terminal u1.

S6.3 In step S6.3, VLR V2 transmits two messages. A first message is transmitted to the HLR that manages the mobile terminal u1 indicating that the mobile terminal u1 has been registered at VLR V2. The second message is transmitted to the HLR that manages the mobile terminal u3 which has been selected as an overflow terminal. The second message indicates that the mobile terminal u3 is an overflow terminal at VLR V2. In this example, both messages are transmitted to the same HLR and are shown as a single message reg_msg(u1, u3).

S6.4 The HLR receives the message reg_msg(u1,u3). In step S6.4, the HLR updates the record for u1. Specifically, the HLR indexes the record corresponding to u1 and replaces the VLR identifier V1 (corresponding to VLR V1, the VLR that covers the RA from which the mobile terminal u1 moved) with the VLR identifier V2 (corresponding to the VLR V2, the VLR that covers the RA into which the mobile terminal u1 moved). The HLR of the overflow mobile terminal u3, in this case the same HLR, indexes the map record corresponding to the mobile terminal u3. The HLR then sets the indication 100 (i.e., flag or bit) to indicate that the mobile terminal u3 is an overflow terminal. Note that the selection of mobile terminal u3 as the overflow terminal was illustrative; the mobile terminal u1 alternatively could have been selected.

S6.5 In step S6.5, the HLR transmits an acknowledgment message reg_ack(u1,profile) to the VLR V2 for the mobile terminal u1. If mobile terminal u1 is also the overflow terminal, then the profile information illustratively is omitted from the message reg_ack.

S6.6 The VLR V2 receives the message reg_ack(u1, profile). In step S6.6, the VLR V2 updates the user record for u1 (e.g., using the profile information in the message, if present) and transmits an acknowledgment message to the mobile terminal u1. Note that if the mobile terminal u1 is the overflow terminal, the user record for mobile terminal u1 is not present in VLR V2 is not updated.

Figure 4:
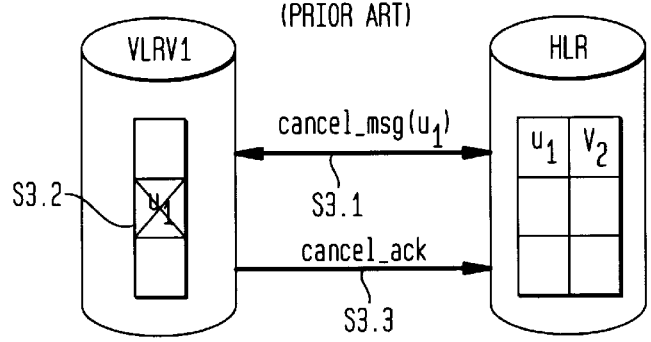
FIG. 4 shows a conventional cancellation process.
Figure 8:
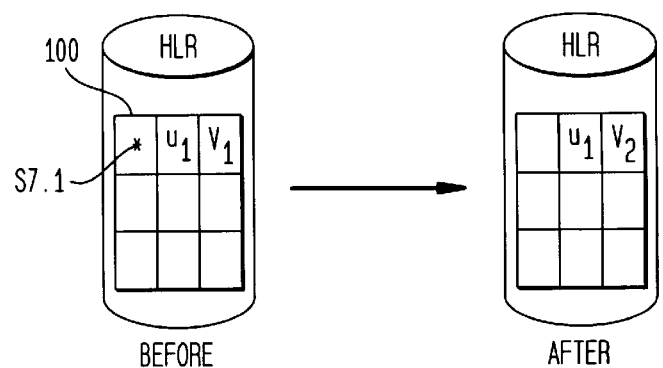
FIG. 8 shows a cancellation process according to an embodiment of the present invention.

FIG. 8 shows a registration cancellation process according to an embodiment of the invention. Assume again that mobile terminal u1 moves from the RA of VLR V1 to the RA of VLR V2. The steps are as follows:

S7.1 In step S7.1, the HLR for mobile terminal u1 determines whether or not mobile terminal u1 was an overflow mobile terminal at VLR V1. This can be achieved by indexing the map records with the mobile terminal u1 identifier and examining the overflow indication 100 in the indexed map record. If the indicator 100 indicates that the mobile terminal u1 is not an overflow mobile terminal, then the same steps S3.1–S3.3 (FIG. 4) are carried out as in the prior art. If the indicator 100 indicates that the mobile terminal u1 is an overflow mobile terminal, the overflow indicator is reset to indicate that the mobile terminal u1 is not the overflow mobile terminal. No steps need be carried out for updating the user records at the VLR V1 since no user record is stored for the mobile terminal u1 if it was an overflow mobile terminal.

Figure 9:
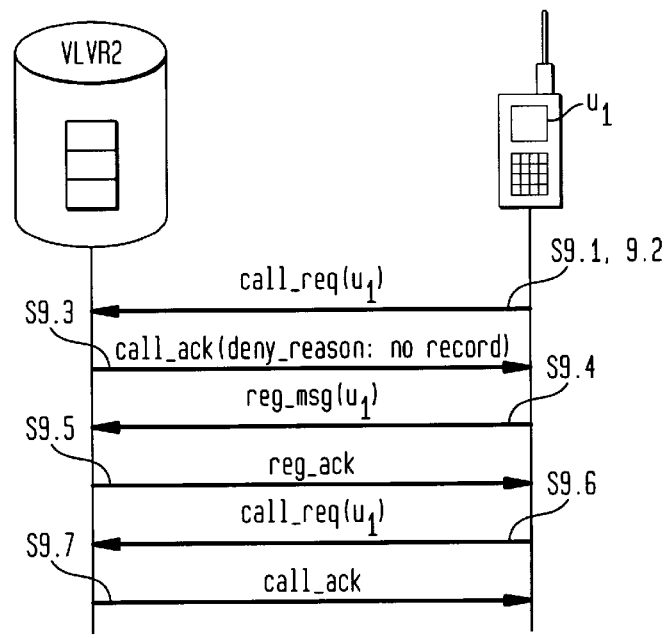
FIG. 9 shows a call origination process according to an embodiment of the present invention.

FIG. 9 shows the call origination process. Assume that the mobile terminal u1 previously registered with VLR V2 but later became an overflow terminal in the RA of VLR V2. The executed steps are as follows:

S9.1,2 In steps S9.1, S9.2, the mobile terminal u1 transmits the call_req(u1) message, requesting origination of a call, to the MSC and the MSC transmits the call_req(u1) message to VLR V2 (the MSC is omitted from FIG. 9 for sake of brevity).

Figure 5:
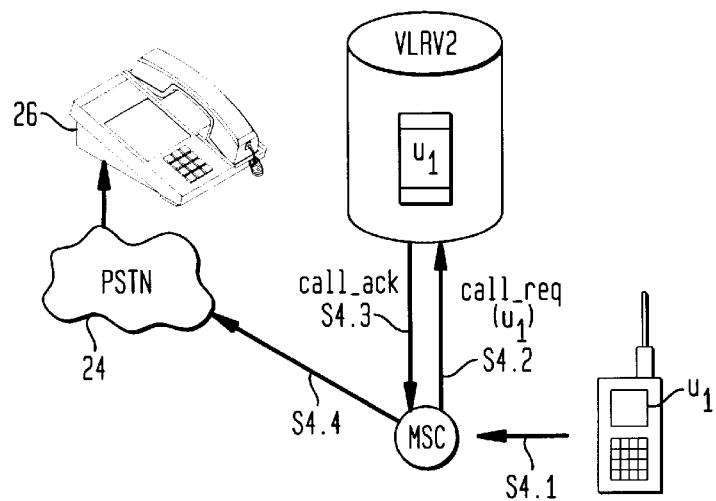
FIG. 5 shows a conventional call origination process.

S9.3 The VLR V2 receives the call_req(u1) message from the MSC. In step S9.3, the VLR V2 examines its user records for a record indexed by mobile terminal u1. If a user record is found, then the call origination process proceeds as described in steps S4.3–S4.4 (FIG. 5) of the prior art. However, in this case, the mobile terminal u1 is an overflow mobile terminal and therefore no user record can be found for the mobile terminal u1. As such, the VLR V2 transmits a message call_ack(deny_reason:no record) denying the request on the grounds that the VLR V2 has no user record for mobile terminal u1.

S9.4,5 In response to receiving the message call_ack (deny_reason:no record) the mobile terminal u1 begins execution of the registration process as outlined in steps S6.1–S6.6 (FIG. 7). Step S9.4 corresponds to step S6.1 and step S9.5 corresponds to step S6.6. (Steps S6.2–S6.5 are not shown for sake of brevity.) In executing step S6.2, the mobile terminal u1 is specifically not selected as the overflow mobile terminal.

S9.6,7 After registering, the mobile terminal u1 is not the overflow mobile terminal. Thus, in step S9.6, the mobile terminal repeats step S9.1. In this case, the call request is accepted and steps similar to steps S4.2–S4.4 are carried out. The step S9.7 corresponds to the step S4.3.

Figure 6:
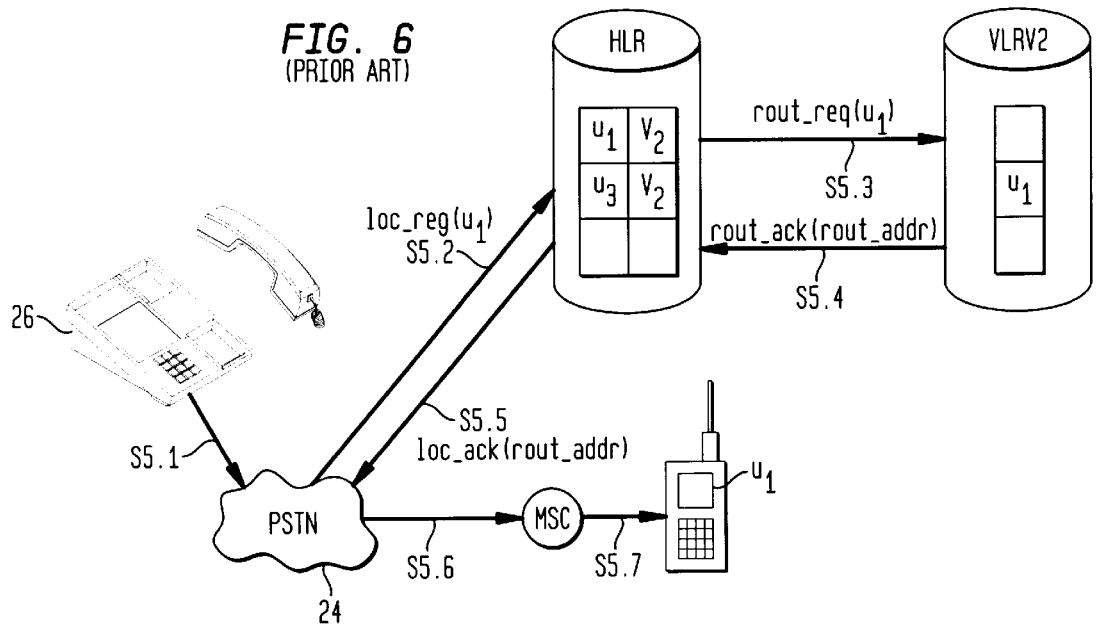
FIG. 6 shows a conventional call termination process.
Figure 10:
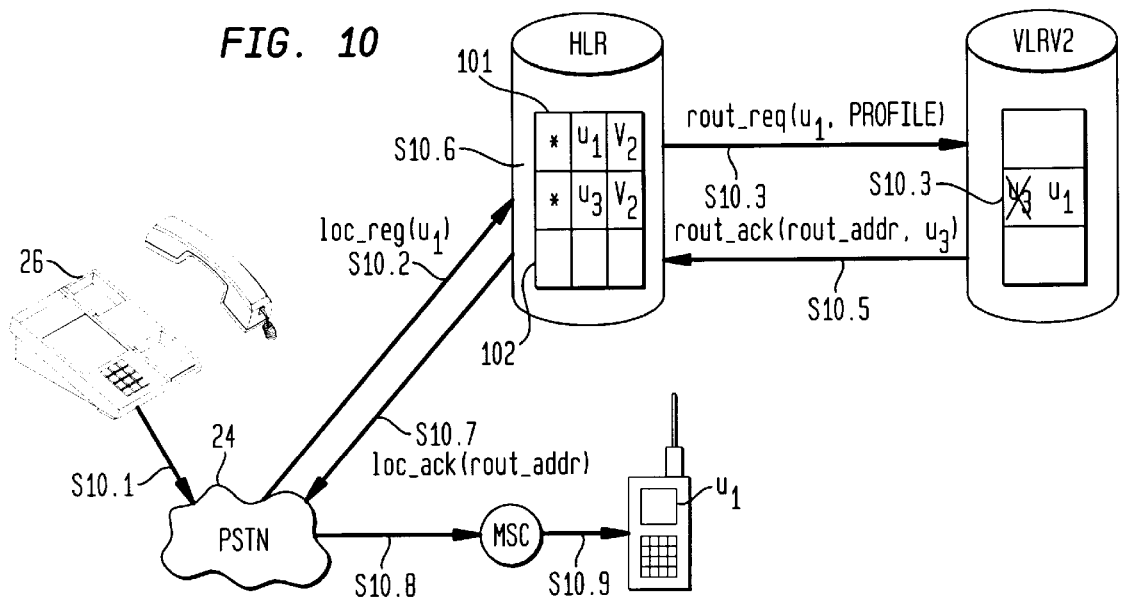
FIG. 10 shows a call termination process according to an embodiment of the present invention.

FIG. 10 shows a call termination process according to an embodiment of the present invention. In this example, assume that a call is to be terminated to overflow mobile terminal u1. The steps for this process are as follows:

S10.1 In step S10.1, the originating terminal 26 dials the number for the mobile terminal u1 as in step S5.1 (FIG. 6).

S10.2 In step S10.2, a switch in PSTN 24 transmits a message loc_req(u1) to the HLR for called mobile terminal u1 requesting routing information, as in step S5.2 (FIG. 6).

S10.3 The message loc_req(u1) is received at the HLR. In step S10.3, the HLR examines the map record indexed by the mobile terminal u1 identifier. Specifically, the HLR examines the overflow indicator 101 of the retrieved map record index by the mobile terminal u1 identifier. If the indicator indicates that the mobile terminal u1 is not an overflow mobile terminal, then the steps S5.3–S5.7 (FIG. 6) are executed. This indicator 101 indicates that the mobile terminal u1 is an overflow terminal at the VLR V2. As such, the HLR transmits a message rout_req(u1,profile) requesting the routing information to the overflow mobile terminal u1. Note that the message includes the profile for u1. The transmitted message indicates to VLR V2 that the mobile terminal u1 is an overflow terminal and therefore will not have a user record at VLR V2.

S10.4 The message rout_req(u1,profile) is received at VLR V2. In step S10.4, VLR V2 determines that the message requests routing information for an overflow mobile terminal u1. Illustratively, this can be determined from the particular message used, the presence of profile information in the message, etc. In response, VLR V2 allocates a user record for the overflow mobile terminal u1 (thereby removing the overflow status of the mobile terminal). Suppose that VLR V2 does not have an available user record to allocate to the mobile terminal u1. In such a case, an existing previously registered mobile terminal, for which VLR V2 has a user record is selected to be an overflow mobile terminal. For example, the mobile terminal u3 is selected to be an overflow mobile terminal. The VLR V2 over-writes the user record for mobile terminal u3 with the identifier and profile for the mobile terminal u1.

S10.5 In step S10.5, VLR V2 transmits a message rout_ack(rout_addr,u3) to the HLR of mobile terminal u1 (from which the rout_req(u1,profile) message was received) acknowledging receipt of the rout_req(u1, profile) message) and returning the routing address "rout_addr" for the mobile terminal u1. If an overflow user, e.g., mobile terminal u3, was designated in step S10.4, then a second message is also transmitted to the HLR of mobile terminal u3 indicating that the mobile terminal u3 has been selected as an overflow terminal. In this case, both mobile terminal u1 and u3 have the same HLR. Thus, VLR V2 transmits a single combined message to the HLR of mobile terminals u1 and u3. Of course, if no overflow user was designated in step 10.4, the second message is not transmitted.

S10.6 The message rout_ack(rout_addr,u3) is received at the HLR. In step 10.6, the HLR changes indicator 101 of the map record corresponding to mobile terminal u1 to indicate that mobile terminal u1 is not an overflow terminal. The HLR which receives the indication that mobile terminal u3 is an overflow terminal (i.e., the same HLR that keeps track of mobile terminal u1 in this case) retrieves the map record indexed by the mobile terminal u3 identifier. The HLR then sets the overflow indicator 102 of this retrieved map record to indicate that the mobile terminal u3 is an overflow terminal.

S10.7 In step 10.7, the HLR transmits a message loc_ack(rout_addr) indicating the routing address for mobile terminal u1 to the switch of the PSTN 24 that transmitted the loc_req(u1) message, as in step S5.5 (FIG. 6).

S10.8 In step S10.8, the PSTN 24 uses the routing address "rout_addr" to connect the call to the MSC as in step S5.6 (FIG. 6).

S10.9 In step S10.9, the MSC pages the mobile terminal u1 and completes the call when the mobile terminal u1 acknowledges the page.

The above discussion is intended to be merely illustrative of the invention. Those having ordinary skill in the art may devise numerous alternative embodiments without departing from the spirit and scope of the following claims.

The claimed invention is:

1. A method for registering a mobile communications terminal comprising the steps of:
    (a) transmitting a first message requesting registration from a first mobile terminal to a visitor location register,
    (b) if said visitor location register has no available user records, selecting one of said first mobile terminal and a second, previously registered mobile terminal, for which said visitor location register contains a map record, as an overflow mobile terminal,
    (c) if said second mobile terminal is selected, over-writing said user record associated with said second mobile terminal with a user record for said first mobile terminal, and
    (d) transmitting a second message to a home location register of said first terminal indicating registration of said first mobile terminal at said visitor location register and a third message to a home location register of said selected mobile terminal indicating that said selected terminal is said overflow mobile terminal.

2. The method of claim 1 further comprising the step of:
    (e) in response to receiving said third message at said home location register of said selected mobile terminal, setting an indication of a map record corresponding to said selected mobile terminal at said home location register indicating that said selected mobile terminal is an overflow mobile terminal.

3. The method of claim 2 further comprising the step of:
    (f) in response to receiving said second message at said home location register of said first mobile terminal, updating a map record corresponding to said first mobile terminal at said home location register of said first mobile terminal to indicate the presence of said first mobile terminal in a registration area covered by said visitor location register, and
    (g) transmitting a fourth message to said visitor location register acknowledging receipt of said second message.

4. A method for canceling registration of a mobile terminal at a first visitor location register when said mobile terminal moves from a first registration area covered by said first visitor location register comprising the steps of:
    (a) at a home location register of said mobile terminal, determining that said mobile terminal has moved outside of said first registration area,
    (b) examining an overflow indication of a map record corresponding to said mobile terminal maintained at said home location register, and
    (c) if said overflow indication indicates that said mobile terminal was an overflow mobile terminal at said first visitor location register, determining that said first visitor location register has already deleted a user record corresponding to said mobile terminal and setting said overflow indication to indicate that said mobile terminal is not an overflow terminal.

5. The method of claim 4 further comprising the step of:
    (d) only if said overflow indication indicates that said mobile terminal was not an overflow mobile terminal at said first visitor location register, transmitting a message from said home location register to said first visitor location register requesting that said visitor location register delete said user record corresponding to said mobile terminal maintained at said first visitor location register.

6. A method for originating a call at a mobile terminal comprising the steps of:
    (a) in response to registering more mobile terminals at a visitor location register than user records which said visitor location register can maintain simultaneously, deleting a user record corresponding to a mobile terminal previously registered with said visitor location register and still within a registration area of said visitor location register,
    (b) receiving a first message for originating a call to said mobile terminal for which said visitor location register deleted said corresponding user record,
    (c) transmitting a second message to said mobile terminal refusing to originate said call,
    (d) re-registering said mobile terminal at said visitor location register, and
    (e) re-initiating and completing a process for originating said call.

7. A method for terminating a call to a mobile terminal comprising the steps of:
    (a) receiving a first message at a home location register requesting routing information for a particular mobile terminal managed by said home location register,
    (b) examining an overflow indicator in a map record corresponding to said particular mobile terminal,
    (c) if said overflow indicator indicates that said particular mobile terminal is an overflow terminal, identifying a visitor location register in a registration area containing said particular mobile terminal and its profile and transmitting a second message to said identified visitor location register requesting routing information for said particular mobile terminal,
    (d) receiving from said visitor location register a third message indicating at least said routing information for said particular terminal, and
    (e) using said routing information, connecting said call to a mobile switching center covering said registration area containing said particular mobile terminal and paging said particular mobile terminal.

8. The method of claim 7 further comprising the steps of:
    (f) receiving said second message at said visitor location register,
    (g) determining routing information for said particular mobile terminal,
    (h) if no unused user records are available at said visitor location register, selecting an overflow mobile terminal, (i) transmitting said third message to said home location register, and (j) transmitting to said home location register corresponding to said selected mobile terminal an indication that said selected terminal is said overflow mobile terminal.

9. In a mobile communications network, a home location register comprising a plurality of map records for recording routing information for routing calls to a predetermined group of mobile terminals managed by said home location register, each of said map records being indexed by a corresponding one of said mobile terminals in said predetermined group and containing a first field indicating a visitor location register covering a registration area into which said corresponding mobile terminal has moved and a second field indicating whether or not said mobile terminal is an overflow mobile terminal at said visitor location register, wherein in response to each map record that stores an overflow indication indicating that said mobile terminal to which said map record corresponds is an overflow terminal, said home location register determines that said visitor location register indicated in said map record fails to store a user record for said mobile terminal.

10. A communications system having a visitor location register comprising:

a receiver for receiving a first message requesting registration from a first mobile terminal at said visitor location register, a storage for selectively storing user records, each of said user records corresponding to a different mobile terminal that moves into a registration area covered by said visitor location register, said storage location also for selecting one of said first mobile terminal and a second, previously registered mobile terminal, for which said visitor location register contains a user record, as an overflow mobile terminal, if said visitor location register has no available user records, and, if said second mobile terminal is selected, for over-writing said user record associated with said second mobile terminal with a user record for said first mobile terminal, and a transmitter for transmitting a second message to a home location register of said first terminal indicating registration of said first mobile terminal at said visitor location register and a third message to a home location register of said selected mobile terminal indicating that said selected terminal is said overflow mobile terminal.

11. The system of claim 10 further comprising a home location register comprising:

a receiver for receiving said third message, and a second storage for, in response to receiving said third message at said home location register of said selected mobile terminal, setting an indication of a map record corresponding to said selected mobile terminal at said home location register indicating that said selected mobile terminal is an overflow mobile terminal.

12. The system of claim 11 wherein said second storage is also for, in response to receiving said second message at said home location register of said first mobile terminal, updating a map record corresponding to said first mobile terminal at said home location register of said first mobile terminal to indicate the presence of said first mobile terminal in a registration area covered by said visitor location register, said home location register further comprising:

a transmitter for transmitting a fourth message to said visitor location register acknowledging receipt of said second message.

13. A communication system for canceling registration of a mobile terminal at a first visitor location register when said mobile terminal moves from a first registration area covered by said first visitor location register having a home location register comprising:

a storage for storing map records corresponding to mobile terminals, and a processor for determining that said mobile terminal has moved outside of said first registration area, for examining an overflow indication of one of said map records corresponding to said mobile terminal maintained at said home location register, and if said overflow indication indicates that said mobile terminal was an overflow mobile terminal at said first visitor location register, determining that said first visitor location register has already deleted a user record corresponding to said mobile terminal and setting said overflow indication to indicate that said mobile terminal is not an overflow terminal.

14. The system of claim 13 further comprising:

a transmitter for, only if said overflow indication indicates that said mobile terminal was not an overflow mobile terminal at said first visitor location register, transmitting a message from said home location register to said first visitor location register requesting that said visitor location register delete said user record corresponding to said mobile terminal maintained at said first visitor location register.

15. A communication system, for originating a call at a mobile terminal, having a visitor location register comprising:

a storage for, in response to registering more mobile terminals at a visitor location register than user records which said visitor location register can maintain simultaneously, deleting a user record corresponding to a mobile terminal previously registered with said visitor location register and still within a registration area of said visitor location register, a receiver for receiving a first message for originating a call at said mobile terminal for which said visitor location register deleted said corresponding user record, and a transmitter for transmitting a second message to said mobile terminal refusing to originate said call, wherein in response to receiving said first message, said mobile terminal re-registers at said visitor location register, and re-initiates a process for originating said call and wherein said mobile communication system completes said process for originating said call.

16. A communication system, for terminating a call to a mobile terminal, having a home location register comprising:

a receiver for receiving a first message requesting routing information for a particular mobile terminal managed by said home location register, a storage for storing map records for mobile terminals, a processor for examining an overflow indicator in a map record corresponding to said particular mobile terminal, and for, if said overflow indicator indicates that said particular mobile terminal is an overflow terminal, identifying a visitor location register in a registration area containing said particular mobile terminal and its profile, and and a transmitter for transmitting a second message to said identified visitor location register requesting routing information for said particular mobile terminal, wherein said home location register receives from said visitor location register a third message indicating at least said routing information for said particular terminal, uses said routing information to connect said call to a mobile switching center covering said registration area containing said particular mobile terminal and wherein said mobile switching center pages said particular mobile terminal.

17. The system of claim 16 further including a visitor location register comprising:

a receiver for receiving said second message, a processor for determining routing information for said particular mobile terminal, and, if no unused user records are available at said visitor location register, selecting an overflow mobile terminal, and a transmitter for transmitting said third message to said home location register, and for transmitting to said home location register corresponding to said selected mobile terminal an indication that said selected terminal is said overflow mobile terminal.

* * * * *